(12) United States Patent
Baving et al.

(10) Patent No.: US 7,404,581 B2
(45) Date of Patent: Jul. 29, 2008

(54) PLUG-IN COUPLING

(75) Inventors: Hans-Juergen Baving, Mannheim (DE);
Gudrun Mannweiler, Mannheim (DE);
Peer Milnazik, Ludwigshafen (DE);
Lars Schiedhering, Sinsheim (DE);
Henrik Zeller, Hockenheim (DE)

(73) Assignee: Friatec Aktiengesellschaft, Mannheim (DE)

( * ) Notice: Subject to any disclaimer, the term of this patent is extended or adjusted under 35 U.S.C. 154(b) by 224 days.

(21) Appl. No.: 10/854,797

(22) Filed: May 27, 2004

(65) Prior Publication Data

US 2005/0012328 A1 Jan. 20, 2005

Related U.S. Application Data

(63) Continuation of application No. PCT/EP02/13002, filed on Nov. 20, 2002.

(30) Foreign Application Priority Data

| Nov. 28, 2001 | (DE) | ................................ 101 58 208 |
| Apr. 17, 2002 | (DE) | ................................ 102 17 127 |
| May 17, 2002 | (DE) | ................................ 102 21 971 |

(51) Int. Cl.
*F16L 33/20* (2006.01)
*F16L 17/025* (2006.01)

(52) U.S. Cl. ................... 285/242; 285/255; 285/331; 277/616; 277/626

(58) Field of Classification Search ............ 285/331, 285/242, 255, 259, 910; 277/616, 626, 627, 277/607, 637, 644, 648
See application file for complete search history.

(56) References Cited

U.S. PATENT DOCUMENTS

| 28,694 | A | * | 6/1860 | Smith ..................... 239/589 |
| 622,313 | A | * | 4/1899 | Woodvine ................ 285/82 |
| 692,795 | A | * | 2/1902 | Moyle ..................... 285/81 |
| 913,484 | A | * | 2/1909 | Fairall .................... 285/361 |
| 965,585 | A | * | 7/1910 | Jones ..................... 313/138 |
| 1,536,559 | A | * | 5/1925 | Carroll ................... 52/297 |
| 1,932,099 | A | * | 10/1933 | Cabana .................. 403/202 |
| 2,820,655 | A | * | 1/1958 | Hileman ................. 403/349 |
| 4,911,573 | A | * | 3/1990 | Pietro .................... 403/349 |
| 4,915,249 | A | | 4/1990 | Anhegger et al. |

(Continued)

FOREIGN PATENT DOCUMENTS

DE 3047867 7/1982

(Continued)

*Primary Examiner*—James M Hewitt
(74) *Attorney, Agent, or Firm*—Crowell & Moring LLP

(57) ABSTRACT

A plug-in connector comprising a base body (6), an annular sealing element (12), a clamping ring (50) and an annular body (20) which can be connected to the base body (6). A pipe end (4, 5) against which the sealing element (12) is arranged in a sealing manner, can be secured in the plug-in connector by the clamping ring (50). The plug-in connector of the invention can be connected to an end (4, 5) of at least one pipe in a simple manner and with a high degree of functional reliability, excluding the risk of assembly errors. For this purpose, the sealing ring (12) is arranged in an annular groove (14) of the base body (6) and comprises two sealing beads (60, 62) which are situated against the inner surface of the inserted pipe end (4, 5) in the manner of two o-ring seals.

32 Claims, 4 Drawing Sheets

U.S. PATENT DOCUMENTS

| | | | |
|---|---|---|---|
| 5,094,464 A | * 3/1992 | Musacchia, Sr. | 473/582 |
| 5,169,168 A | * 12/1992 | Harry et al. | 280/511 |
| 5,297,906 A | * 3/1994 | Durand | 409/131 |
| 5,462,313 A | 10/1995 | Rea et al. | |
| 5,692,785 A | 12/1997 | Wartluft et al. | |
| 6,773,039 B2 | 8/2004 | Muenster et al. | |

FOREIGN PATENT DOCUMENTS

| | | |
|---|---|---|
| DE | 19935246 | 12/2000 |
| DE | 19932718 | 5/2001 |
| DE | 19945721 | 8/2001 |
| DE | 19959067 | 8/2001 |
| NL | 301633 | 10/1965 |
| WO | WO 00/75554 | 12/2000 |

* cited by examiner

United States Patent US 7,404,581 B2

PLUG-IN COUPLING

CROSS REFERENCE TO RELATED APPLICATIONS

This application is a continuation of international patent application no. PCT/EP02/13002, filed Nov. 20, 2002 designating the United States of America and published in German as WO 03/046429 A1, the entire disclosure of which is incorporated herein by reference. Priority is claimed based on Federal Republic of Germany patent application nos. DE 101 58 208.0, filed Nov. 28, 2001; DE 102 17 127.0, filed Apr. 17, 2002, and DE 102 21 971.0, filed May 17, 2002.

BACKGROUND OF THE INVENTION

This invention relates to a plug-in coupling comprising a base body, an annular sealing element, a clamping ring and an annular body which is connectable to the base body, in which a pipe end can be fixedly secured in sealing contact with the sealing element in the plug-in coupling by the clamping ring.

Published international patent application no. WO 00/75 554 A1 discloses a plug-in coupling of this type which is constructed as a double socket and comprises a base body and a holding or clamping device for ends of each of two pipes which are to be joined together, in which the ends are insertable into the plug-in coupling. The holding device has a clamping ring which has a clamping cone on the outside radially and at least one clamping rib on the inside that can be brought into engagement with the respective pipe end. Each clamping ring is surrounded on the outside by a socket which has a mating cone on the inside radially for bracing the clamping ring. The base body has an annular groove close to the front end area with a ring-shaped sealing element which is in sealing contact with the inside surface of the pipe end inserted into the socket. The front end area of the base body and the front end of the sockets are arranged at a slight distance from the annular groove. If the pipe end is not inserted coaxially with the longitudinal axis of the plug-in coupling into the annular gap between the base body but instead is inserted at a greater or lesser angle to the longitudinal axis of the plug-in coupling, there is a risk that the sealing element will be forced at least partially out of the annular groove or damaged so that the required tight connection cannot be established and/or assured with the required functional reliability.

SUMMARY OF THE INVENTION

It is therefore an object of the invention to provide an improved plug-in coupling for connecting pipe ends.

Another object of the invention is to provide a plug-in coupling with which a connection to at least one pipe end can be made with little effort and with a high functional reliability.

A further object of the invention is to provide a plug-in coupling which facilitates proper functional handling during assembly and reduces or eliminates the risk of assembly mistakes.

An additional object of the invention is to provide a plug-in coupling which can be manufactured with a small amount of material and has a small design volume.

It is also an object of the invention to provide a plug-in coupling which is equally usable for pipes made of different materials such as synthetic resins (plastics) or metal or a laminate (laminated pipes made of plastic with a metal interlayer).

Yet another object of the invention is to provide a plug-in coupling which is suitable for use with pipes made of comparatively soft materials such as polyethylene.

A still further object of the invention is to provide a plug-in coupling which ensures a secure connection that will last for many years.

In addition, the plug-in coupling should be suitable for use in the plumbing field, in particular for hot and cold water installations, whereby changes in material due to changes in temperature of the flowing medium, in particular with regard to the dimensions or rigidity, should be reliably absorbed by the plug-in coupling.

These and other objects are achieved in accordance with the present invention by providing a plug-in coupling comprising a base body, an annular sealing element, a clamping ring, and an annular body which is connectable to the base body, wherein an inserted pipe end in sealing contact with the sealing element can be fixedly secured in the plug-in coupling by the clamping ring, and wherein the sealing element is arranged in an annular groove in the base body and has two sealing beads which contact the inside surface of the inserted pipe end in the manner of two O-rings.

The plug-in coupling according to the invention is characterized by a functionally reliable design and can be manufactured and installed relatively simply. The base body which engages partially in the interior of the pipe end ensures a secure radial support of the pipe end so as to ensure that the clamping forces of the holding means will be reliably absorbed and transmitted even under variable operating conditions and to ensure a secure seal. A socket which is also referred to below as an annular body or hood and which surrounds the pipe end on the outside radially is coupled to the base body, whereby the pipe end is securely clamped in an annular space between the base body and said socket. The socket and/or the annular body includes a preferably conical inside surface, whereby the clamping ring is situated between the inside surface and the outside surface of the pipe end and is engaged in a non-positive and/or form-fitting manner on both sides with the inside surface of the annular body as well as with the outside surface of the pipe end. The sealing element is advantageously situated on the part of the base body which engages in the pipe end and is in sealing contact with the inside surface of the pipe end.

In one preferred embodiment, the sealing ring comprises two sealing beads that are on the outside radially and are designed in the manner of an O-ring and/or behave like O-rings. The sealing beads are parts of sealing areas which have an at least partial and/or at least approximately circular cross-sectional area in an axial sectional plane. Preferably at least one of the two sealing beads lies on a circle whose diameter is at least approximately equal to the radial thickness of the sealing area. The sealing beads and/or the sealing areas that are designed at least approximately as O-rings are integrated in one piece into the sealing element, with an axial connecting part having a comparatively small radial thickness being provided between them.

In the case of plug-in couplings for comparatively small pipe diameters, i.e., nominal widths, in particular d16 to d25, the first sealing bead which is on the forward end in the direction of insertion advantageously has an outside diameter which is smaller by a predetermined amount than the second sealing bead which follows it in the direction of insertion. For larger diameters, i.e., nominal widths, in particular beyond d32, however, the distal first sealing bead has a greater outside diameter than the second sealing bead.

In axial sectional planes, said sealing beads lie at least approximately on circular cross-sectional areas whose radius is predetermined in such a way that they are at least approximately tangent to the inside surface of the sealing ring. In other words, the sealing ring comprises two sealing areas which are designed at least approximately as O-rings and which are connected to one another in one part via the connecting part. This connecting part has a smaller outside diameter on the outside radially than said sealing beads, whereby a deformation space is created between the sealing beads, accommodating the deformation of the sealing beads in particular in the case of narrow pipe tolerances, in order to keep the pressure below the critical level.

The sealing element has an annular radial groove on its inside radially to prevent it from slipping out of the annular groove of the base body. A preferably ring-shaped securing element or holding body corresponds to and engages in the annular groove of the sealing element. As additional security to prevent the sealing element from slipping out of the annular groove in the base body, the sealing element also has a stop on one end which is in contact with the annular groove or the sealing groove in the base body when pressure acts on it.

In a preferred embodiment, the clamping ring has a holding claw on both the radial inside and the radial outside. This holding claw is pressed into the outside surface of the pipe end and/or into the inside surface of the annular body, thus ensuring a high functional reliability for axial securing of the pipe end with respect to the plug-in coupling.

On the free forward end, the socket has an extension with an inner guide area having a predetermined axial length. Because of the extension and/or the guide area, the pipe end is essentially aligned coaxially with the longitudinal axis when inserted into the plug-in coupling. An angular position of the pipe and/or the pipe end on insertion into the plug-in coupling is thus minimized so that the sealing element consequently is exposed only to axial forces. An inclined position of the pipe end on insertion into the coupling is substantially prevented and this prevents the risk of the sealing element being pushed or squeezed out and results in a simple handling and a high degree of functional reliability.

In addition or alternatively, within the scope of this invention the base body may also have an extension on the forward end in front of the sealing element with a guide area for centering the pipe end on insertion. Thus the base body has an end face or a stop face on a web which is directed radially outward so that the end face of the pipe end inserted into the plug-in coupling comes to rest against this stop face after it is completely inserted. The annular groove accommodating the sealing element and in particular its forward end face are spaced a comparatively great distance from this end face or stop face. This distance is at least approximately equal to or greater than the inside diameter of the socket and/or the guide area, whereby the inside diameter is essentially equal to the outside diameter of said pipe end.

Furthermore with the plug-in coupling according to this invention, the clamping ring is arranged axially between the area of the annular groove with the sealing element and said end face or stop face. Furthermore in a particular embodiment of this invention, the wall of the annular groove accommodating the sealing element said wall being arranged at a distance from the free end of the base body, is designed as an undercut in which the sealing element is clamped when the pipe end is inserted. This prevents the sealing element from being forced out of the annular groove when the pipe end is inserted.

Moreover, it should be pointed out explicitly that the plug-in coupling of the invention is part of a fitting for connecting two or more pipes, e.g., in the form of an angle, a T-piece or a double socket with a coaxial alignment of the coupling parts. In addition, the plug-in coupling may be part of a fitting or a housing of a fitting for connection of a single pipe end or part of a transition piece between pipes made of different materials or the like. When designed as a fitting or a double socket for connecting two or more pipes, their axes may have any angular positions relative to one another. It should also be pointed out that the plug-in coupling can be used in particular for pipes made of different material and/or having different material properties.

Special embodiments and refinements of this invention are described in further detail hereinafter.

BRIEF DESCRIPTION OF THE DRAWINGS

The invention will be explained in greater detail hereinafter with reference to illustrative preferred embodiments shown in the accompanying drawing figures, although it is not restricted to these embodiments, in which.

DETAILED DESCRIPTION OF PREFERRED EMBODIMENTS

Figure 1:
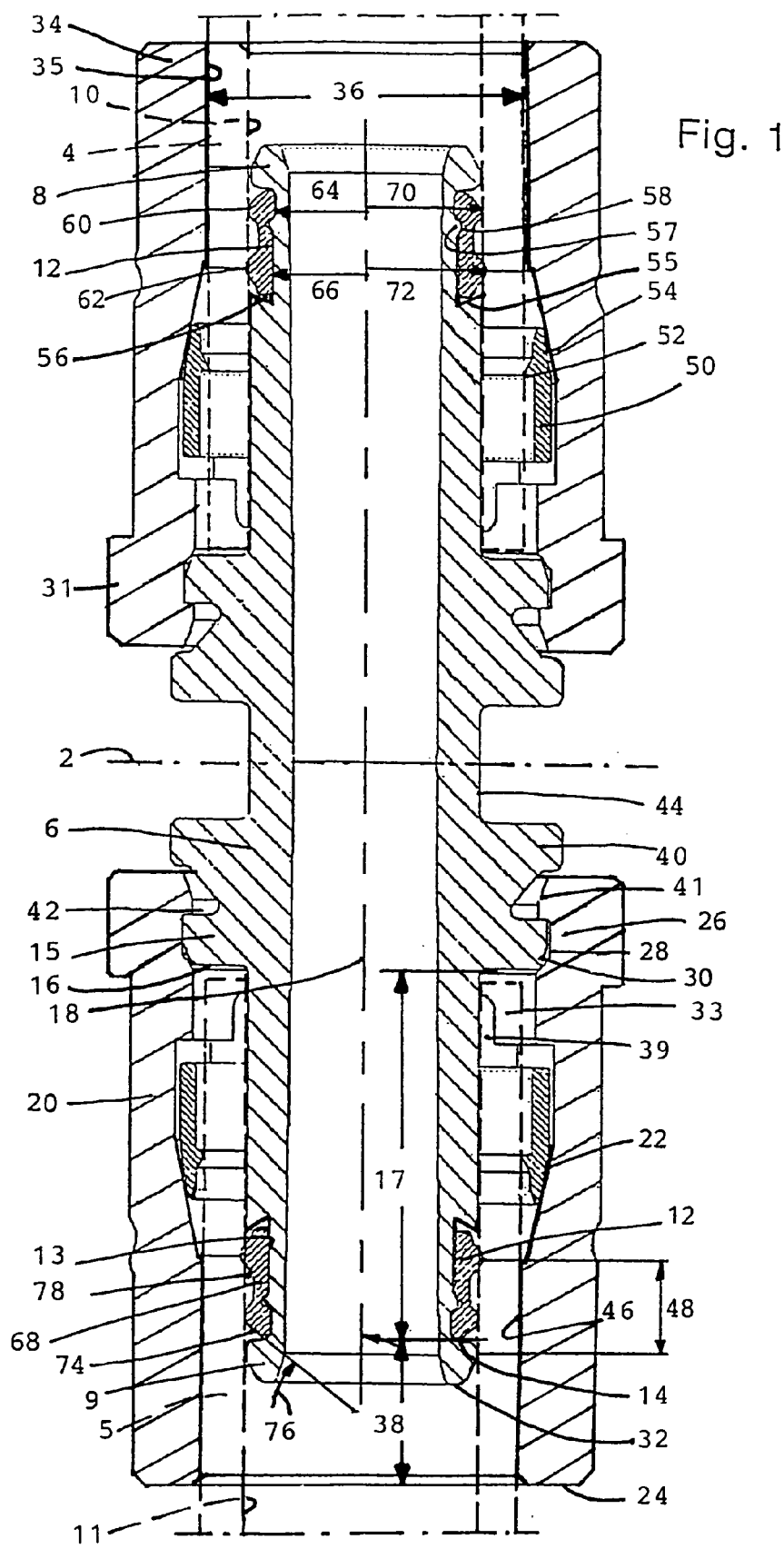
FIG. 1 shows an axial longitudinal section of a plug-in coupling according to the invention for connecting two pipe ends.

The plug-in coupling according to FIG. 1 is constructed as a double socket which is symmetrical with the middle plane 2 and serves to join the two pipe ends 4, 5, which are indicated schematically. This double socket thus contains two parts, one each on the left and right of the middle plane 2, each separately forming a plug-in coupling according to the invention. The following discussion applies accordingly to the two symmetrical parts of the double socket shown here.

The double socket, i.e., the plug-in coupling, comprises a base body 6 which is partially inserted into the two pipe ends 4, 5, the end areas 8, 9 of the base body 6 preferably being constructed as conical enlargements which extend radially from the free ends of the base body 6 to the outside in the direction of the inside surfaces 10, 11 of the particular pipe end 4, 5 and extend radially outward. A sealing element 12 is in sealing contact with the respective inside surface 10, 11 and is situated in an annular groove 13 in the exterior surface of the base body 6. The annular groove 13 has a forward end face 14 which is closest to the forward end area 8, 9 of the base body 6.

The base body 6 also comprises a first web or collar 15 which is directed radially outward with a forward end face or stop face 16 as the stop for the end face of the pipe end 4, 5 inserted into the plug-in coupling. The web or collar 15 is preferably constructed as a peripheral closed ring with respect to the longitudinal axis 18, but the web 15 may also be subdivided into a number of segments. The forward end face 14 is arranged at a distance 17 from the end face 16 of the web or collar 15.

Furthermore, a socket or an annular body 20 is also provided, surrounding the exterior of the respective pipe end 4, 5. The annular body 20 comprises on the inside a preferably conical clamping face 22 whose inside diameter decreases toward the free end 24 of the respective annular body 20. The hood and/or the annular body 20 also comprises a connecting element 26 which is engaged with the first web 15. The web 15 thus has a double function, namely serving as a stop for the pipe end and as a fastening for the annular body 20.

In one advantageous embodiment, the connecting element 26 has an annular groove 28 on the inside with the first web 15 with its edge 30 on the outside radially engaging in this annular groove. The annular body 20, in particular its connecting element 26, extends beyond the end face of the inserted pipe end in the axial direction, namely away from the free end 32 and also in particular surrounds the outside edge of the first web 15 in a ring shape. At least the connecting element 26 is elasticity deformable so that it can be pushed away over the outside edge 30 of the first web 15 for assembly purposes in order to assume the locked position with respect to the base body 6 as illustrated in the drawing.

The socket and/or the annular body 20 has an enlarged outside diameter, i.e., a radial enlargement 31 on the outside radially in the area of the connecting element 26. This ensures an increased mechanical load bearing capacity, and the risk of separation or rupture of the socket from the first web 15, which is designed as a collar, of the base body is reduced. This radial enlargement 31 forms a reinforcement of the rear area of the socket 20.

In a particularly advantageous embodiment, the connection of the annular body 20 to the base body 6 is assembled (i.e., manufactured) at the factory so that before insertion of the pipe end an annular gap 33 is provided between the base body 6 which is on the inside radially and the annular body 20 which is on the outside radially, so that the pipe end 4,5 can be inserted axially into this annular gap when the connection of the plug-in coupling is established.

The socket 20 has an extension 34 which protrudes beyond the end area 8 of the base body 6, having a preferably cylindrical guide area 35 on the inside, with the guide area having an inside diameter 36. The inside diameter 36 is essentially the same as the outside diameter of the inserted pipe end 4, 5. The forward end 24 of the extension 34 and thus the socket 20 is situated at a predetermined distance 38 from the front end face 14 of the annular groove 13 with the sealing element 12. Based on the forward end face 14 of the annular groove 13, the extension 34 and/or its interior guide area 35 thus has/have an axial length 38.

The size of the length 38 according to this invention is in the range between 30% and 60%, preferably between 40% and 50% of the inside diameter 36. Thus in a preferred manner a coaxial alignment and guidance of the pipe end on insertion into the plug-in coupling is ensured. The axial length 38 is maximally predetermined within the scope of this invention such that a minimal use of materials and a small design volume are ensured, with an optimized coaxial guidance and alignment of the pipe end being ensured at the same time.

In the embodiment shown in FIG. 1, the annular body 20 is permanently and inseparably joined to the base body 6 by the connecting elements 26. As an alternative, within the scope of this invention, the connection may also be designed to be detachable, in which case the connecting element(s) each has/have in particular an inside thread which is engaged with a corresponding outside thread on the base body. In addition, it may also be within the scope of this invention for other connections of the annular body to the base body, e.g., in the manner of a bayonet closure, to be provided.

The annular body 20 comprises at least in the area of the web 16 and/or the stop for the pipe end 4, 5 an inspection window 39 and/or a transparent area such that the end face on the inside radially and/or the adjacent part of the pipe end 4, 5 is visible from the outside. This creates the opportunity of a visual inspection so that an incomplete insertion of the pipe end 4, 5 in assembly or perhaps a partial separation of the pipe end subsequently can be recognized readily if it occurs. Advantageously, a number of such inspection windows are distributed around the circumference of the annular body 20, in particular in the form of radial passages or openings or a number of transparent regions so that visual inspection can be performed with no problem from any side of the plug connection.

In an alternative embodiment, the complete annular body 20 is made of a transparent material, in particular plastic. The inspection window 39 and/or the transparent region is provided according to this invention outside of the inside area of the plug-in coupling which is sealed by the sealing element. The connecting element(s) 26 of the annular body 20 together with the base body 6 is/are provided axially adjacent to the inspection window(s) and/or transparent region(s) 39 thereof, namely away from the free end 32 of the base body 6.

The base body 6 also has a second web 40 at a distance axially from the first web 15 such that the annular body 30 with a hook-shaped projection 41 extending radially inward engages in the annular space 42 between the webs 16, 38 which are arranged at an axial distance, this engagement being for the purpose of locking the annular body 20 on the base body 6. The second radial web 40 serves as a coupling limit for the annular body 20 in assembly on the base body 6. With the embodiment as a double socket shown here, an annular groove 44 of the base body 6 is provided between the two second webs 40 that are spaced an axial distance apart. This annular groove 44 may be used as acting means, e.g., as a hex-head for a tool in establishing the connection to the annular body 20 and/or the pipe end 4, 5.

As shown in the drawing, the annular body 20 has a region 46 with a predetermined axial length 48 adjacent to the extension 34 in the direction of the middle plane 2. The sealing element 12 is arranged at least partially, and preferably substantially inside this region 46. With the region 46 and the extension region 34, the annular body 20 is at least approximately in contact with the outside surface of the respective inserted pipe end 4, 5. The inside surface of the annular body 20 is preferably cylindrical in design in said region 46 and thus ensures a secure radial support of the inserted pipe end and consequently a secure seal by the sealing element 12 which is on the inside radially.

The preferably conical clamping face 22 for the clamping ring 50 as mentioned above is in axial contact with the cylindrical region 46 of the annular body 20. The clamping ring 50 comprises at least one first inner holding claw 52 which is designed in particular in a ring shape and is pressed into the outside surface of the pipe end 4, 5. According to this invention, this clamping ring 50 is arranged axially between the web 15 and/or its front end face 16 and the annular groove 13 which holds the sealing element 12. Thus there is a clear separation of function of the region having the clamping ring 50 and the region 24 assigned to the sealing element, so that the dimensions for the clamping and for the sealing of the pipe end inserted can be predetermined independently of one another. This is particularly important for pipes made of comparatively soft materials.

In an advantageous embodiment, the clamping ring 50 also has at least one second holding claw 54 which is on the outside radially and is pressed into the clamping face 22 of the annular body 20. The holding claw(s) 52, 54, preferably ring-shaped, ensure a high surface pressure due to the essentially linear engagement, pressing into the outside surface of the pipe end 4, 5 and/or into the inside clamping surface 22 of the annular body 20 and thus ultimately ensures a secure locking effect against axial extraction forces acting on the pipe end 4, 5 to pull it out of the plug-in coupling.

As shown in the drawing, the clamping ring 50 in the plug-in coupling according to the invention is situated axially between the annular groove 14 with the sealing element 12 and the first web 16 and/or the end of the annular gap 34. The clamping ring 50 is thus spaced an axial distance away from the sealing area with the annular sealing element 12, so that the clamping forces on the one hand and the sealing forces on the other hand can be dimensioned and preselected independently of one another through appropriate dimensioning of the region of the annular body 20 assigned to the clamping ring 50 and of the base body on the one hand and the sealing region with the sealing element 12 on the other hand. According to this invention, a preferably cylindrical region of the base body 6 is present in the area of the clamping ring 50 on the inside radially so that the clamping forces are accommodated by the region of the base body 6 which is on the inside radially in a functionally reliable manner.

In a preferred embodiment, the rear end face 55 of the annular groove 13 which is at a distance from the front end area 8, 9 of the base body 6 is arranged at an inclination to the longitudinal axis 18 such that an undercut 56 is formed. When the pipe end is inserted into the plug-in coupling, the sealing element 12 is thus forced into this undercut 56 so that the sealing element 12 is held with a high functional reliability in the annular groove 13 and the sealing element 12 is prevented from being squeezed or forced out. Furthermore, the annular groove 13 has a preferably ring-shaped holding body 57 which is directed radially outward and engages in a corresponding annular groove 58 in the inside surface of the sealing element 12. This axially fixes the sealing element 12 and secures it against slipping out of the annular groove 14 in the base body 6.

On the outside radially the sealing element 12 has a first sealing bead 60 which is situated next to the end area 8 and also has a second sealing bead 62 so that a double seal and a high functional reliability for a long lifetime of many years and decades are ensured. In the area of the first sealing bead 60 the preferred cylindrical inside surface of the sealing element 12 has an inside radius 64 while in the area of the second sealing bead 62 the inside surface of the sealing element 12 is on an inside radius 66. The inside radii 64, 66 correspond essentially to the radii of the respective bottom surfaces of the annular groove 13.

The sealing areas of the sealing beads are joined together in one piece by an axial connecting part 68. Furthermore the first sealing bead 60 has an outside radius 70 and the second sealing bead 62 has an outside radius 72. The sealing geometry of the sealing element 12 with the two ring-shaped sealing beads 60, 62 is predetermined in such a way that they behave like two O-rings. As explained initially, in the embodiment plug-in coupling shown here which is provided for comparatively small nominal widths, the outside radius 70 of the first sealing bead 60 is smaller by a predetermined amount than the outside radius 72 of the second sealing bead 62.

In a preferred embodiment, the sealing element 12 has an inclined surface 74 in the direction toward the end area 8, 9, i.e., the free end 32 of the base body 6. The essentially conical inclined surface 74 forms with the longitudinal axis 18 a cone angle 76 which opens in the direction away from the end area 8, 9 and preferably has a size in the range of 40° to 50°. Because of the inclined surface 74, the insertion forces on insertion of the pipe end 4, 5 into the plug-in coupling are reduced.

Axially between the two sealing beads 60 and 62 there is a deformation space 78 which accommodates the deformation of the two sealing beads 60, 62 especially in the case when the pipe tolerances are narrow, so that it is possible to press the sealing beads in a functionally reliable manner and/or the pressing of the beads remains below a critical level. The connecting part 68 of the sealing element 12 between the two sealing beads 60, 62 is surrounded on the outside radially by the ring-shaped deformation space 78. The sealing regions with the sealing beads 60, 62 and the connecting part 68 are integral parts of the sealing element 12 which is constructed in one piece.

Figure 2:
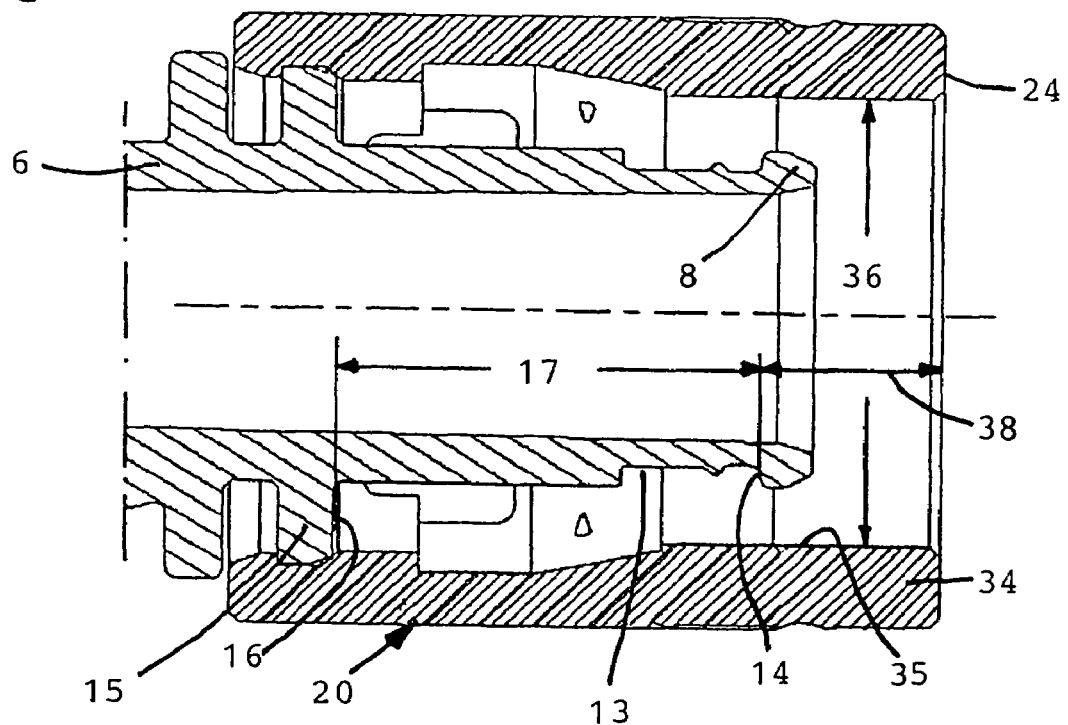
FIG. 2 shows an axial longitudinal section of one part of the plug-in coupling, in which only one part of the base body and the socket connected to it are shown.

FIG. 2 shows the sleeve 20 whose extension 34 protrudes beyond the front end area 8 of the base body 6. The forward end 24 of the sleeve 20 has a predetermined distance with the length 38 from the front end face 14 of the annular groove 13 of the base body 6. According to this invention, the length 38 is preselected to be in the range between 30% and 60% of the inside diameter 36 of the sleeve 20 and/or the extension 35. In addition it should be pointed out that the forward end face 14 of the annular groove 13 is arranged at a distance 17 from the end face or stop face 16 of the first web 15. The distance 17 is in the range between 50% and 130%, preferably between 60% and 120%, in particular between 70% and 110% of the inside diameter 36.

Figure 3:
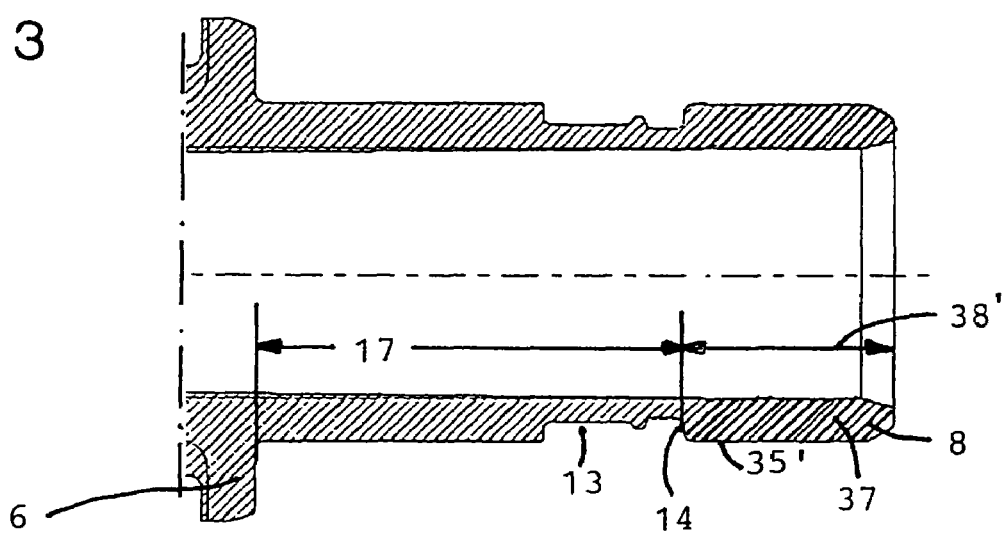
FIG. 3 is a partial view of an axial longitudinal section of the lengthened base body.

FIG. 3 shows a preferred embodiment of the base body 6 with an extension 37. A base body 6 having such an extension may be provided additionally or alternatively to the lengthened sleeve described here. The forward end 8 of the base body 6 lengthened in this way is at a predetermined distance of the length 38' from the forward end face 14 of the annular groove 13. The extension 37 comprises a guide region 35' which is on the outside radially for centering, i.e., for coaxial alignment of the pipe end to be inserted into the plug-in coupling. The size of the length 38' is in the range between 30% and 60%, preferably between 40% and 50% of the abovementioned inside diameter of the sleeve of the extension region. In addition, within the scope of this invention, the size of the axial length 38' is in the range between 30% and 60%, preferably between 40% and 50% of the distance 17 of the forward end face 14 of the annular groove 13 from the forward stop face or end face 16 of the first web 15.

Figure 4:
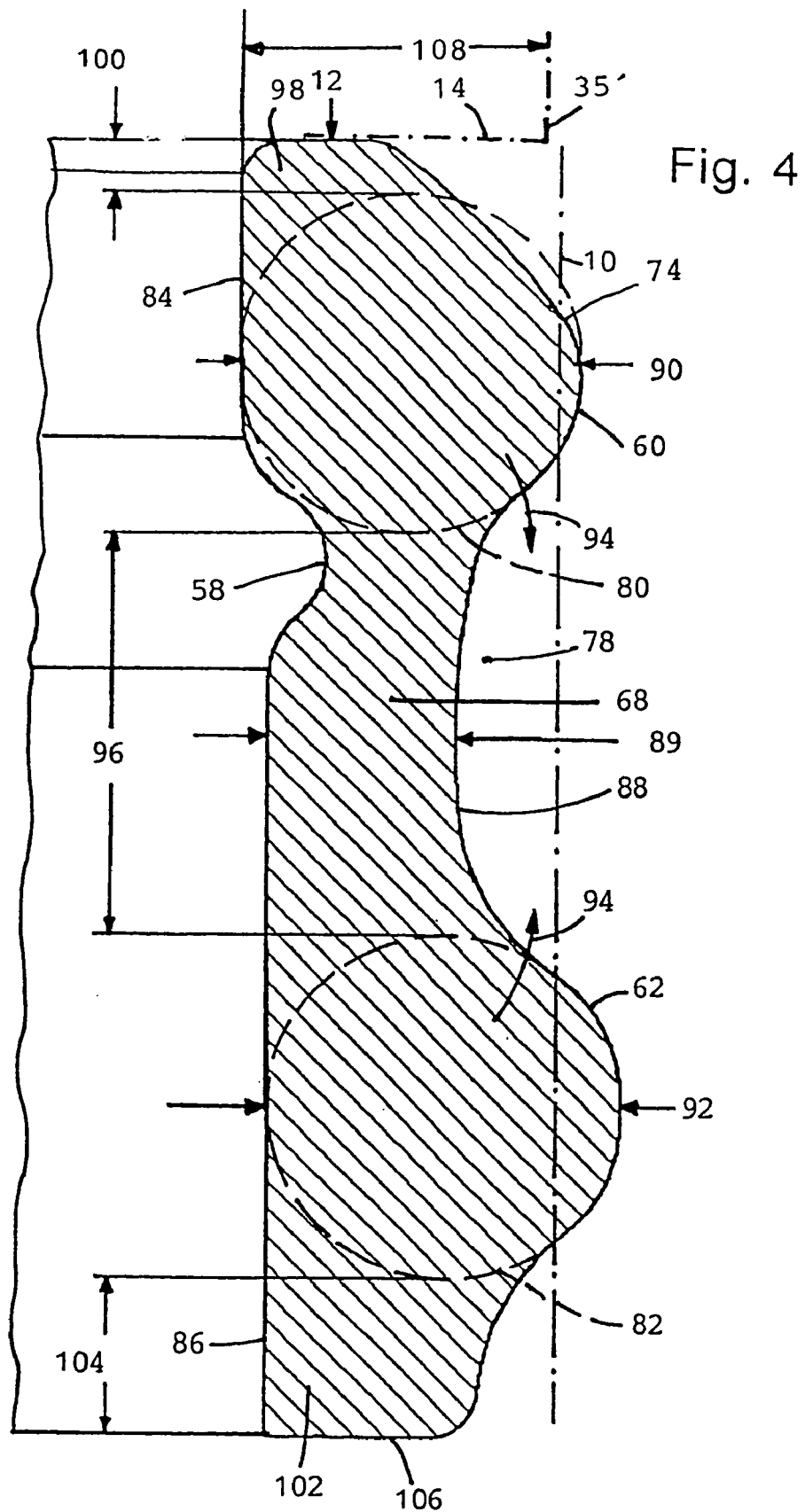
FIG. 4 shows an enlarged and partially sectional view through the sealing element in an axial sectional plane.

FIG. 4 shows on an enlarged scale an axial sectional plane showing partially the sealing element 12 with the first forward sealing bead 60 and the second sealing bead 62 which is at a distance axially. It should be pointed out that the sealing element 12 and thus the sealing beads 60, 62 are designed in a ring shape, i.e., as a toroidal shape and are essentially arranged coaxially with the longitudinal axis of the plug-in coupling. The two sealing beads 60, 62 lie in the axial sectional plane at least approximately on circles 80, 82 which are shown by dotted lines.

Furthermore it should be pointed out that based on the longitudinal axis in the peripheral direction the cross-sectional areas which are in axial longitudinal planes are designed to be the same and/or equally large. The sealing element 12 comprises a first cylindrical inside surface 84 and a second cylindrical inside surface 86 which run at least approximately tangentially to these circles 80 and/or 82. Each circle 80, 82 corresponds at least approximately to the outside contour of an O-ring. The connecting part 68 of the sealing element 12 is present between the two sealing beads 60, 62 and/or the aforementioned O-rings. The connecting part 68 is bordered on the inside radially by the second cylindrical inside surface 86 and on the outside radially by an outside surface 88 which is essentially coaxial with the longitudinal axis and is surrounded by said deformation space 78.

The radial connecting part 68 has a radial thickness 89 which is smaller by a predetermined amount than the radial thicknesses 90, 92 of the sealing element 12 in the area of the two sealing beads 60, 62. The radial thicknesses 90, 92 correspond to the diameters of the abovementioned circles 80, 82 and/or said O-rings that are integrated into the sealing element 12. The radial thicknesses 90, 92, i.e., the diameters of the two O-rings designed in this way are essentially the same. Since the radial thickness 89 of the connecting part 68 is much smaller than the radial thickness 90, 92 in the area of the two sealing beads 60, 62, the sealing element 12 behaves at least approximately like O-rings in the area of the sealing beads 60, 62.

The inside surface 10 of the pipe end described above is indicated with a broken line. When the pipe end is inserted, deformation of the two ring-shaped sealing beads 60, 62 according to the arrows 94 is possible as is the case with separate individual O-rings. The inside surface of the sealing element is designed as a stepped surface, with the inside radius 64 being smaller in the area of the first sealing bead 60 or O-ring than the inside radius 66 in the area of the second sealing bead 62 or O-ring. Consequently, the first sealing bead 60 is deformed less than the second sealing bead 62 on insertion of the pipe part, so the insertion resistance is reduced accordingly.

The insertion resistance is further reduced in an advantageous manner in combination with the conical inclined face 74 mentioned above. In an advantageous embodiment the radial thickness 89 is in the range between 40% to 70%, advantageously between 50% and 60% of the radial thickness 90 and/or 92 in the area of the sealing beads 60 and/or 62. The connecting part 68 has an axial length 96 (measured from the circular contour 80 and the circular contour 82) which is at least approximately the same as the radial thickness 90, 92. This axial length 96 is preferably greater by a predetermined amount than the radial thickness 90 and/or 92 of the two sealing beads 60, 62. In particular the axial length 96 is in the range between 100% and 130%, in particular between 110% and 120% of the radial thickness 90 and/or 92.

As also shown in the drawing, the annular groove 58 in which the correspondingly designed holding body of the base body engages is in the area of the connecting part 68. The annular groove 58 according to this invention is outside the circular contour 80 of the first sealing bead and/or the corresponding O-ring so that when the pipe end is inserted as in the case of a separately designed O-ring, the sealing element 12 is secured and held on the whole in the abovementioned annular groove of the base body. The functioning of the forward sealing area with the first sealing bead 60 which is on the outside radially thus still corresponds to that of an O-ring.

The sealing element 12 comprises a forward axial end part 98 in front of the area of the first sealing bead 60 and/or the first O-ring corresponding to the circle 80, the axial length 100 of this forward axial end part being much smaller than the radial thickness 90. The axial length 100 is within the range between 10% to 40%, preferably between 15% and 30% of the radial thickness 90 and amounts to at least approximately 20%.

Furthermore the sealing element 12 has a rear axial end part 102 with an axial length 104 axially adjacent to the region of the second sealing bead 62 and/or the second O-ring. The, axial length 104 is smaller by a predetermined amount and/or is much smaller than the radial thickness 92 of the region of the second sealing bead 62 and/or the second O-ring, advantageously in the range between 30% and 60%, preferably between 40% and 50%.

The rear axial end part 102 has a stop face or end face 106. The end face 106 is advantageously essentially in a radial plane. When subjected to pressure and/or when the pipe end is inserted, the end face 106 comes to rest against the respective wall of the annular groove of the base body and thus serves as a stop.

The forward end face 14 of the annular groove and the guide area 35' of the base body 6 which is on the outside radially are indicated with dash-dot lines. It is especially important that the annular groove 13 has a groove depth 108 such that the enclosed part of the sealing element is as large as possible. The outside diameter of the guide region 35' of the base body which is on the outside is essentially equal to the inside diameter of the pipe end to be inserted into the plug-in coupling. Thus only a comparatively small portion of the sealing element protrudes out of the annular groove of the base body, thus minimizing the risk of the sealing element slipping out when the pipe end is inserted into the plug-in coupling because of the optimized enclosure of the sealing element 12 in the groove 13.

Figure 5:
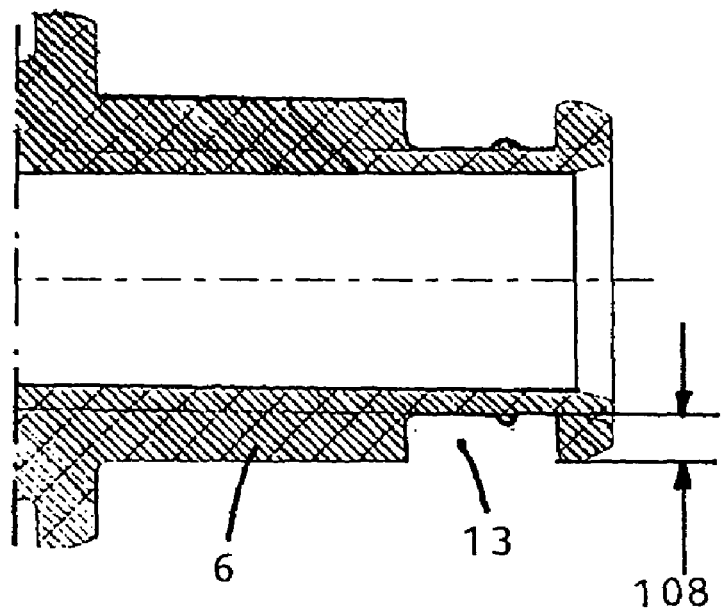
FIG. 5 shows an axial longitudinal section through the base body in one preferred embodiment.

FIG. 5 shows an axial longitudinal section of the base body 6 with the enlarged annular groove 13 having the groove depth 108.

Figure 6:
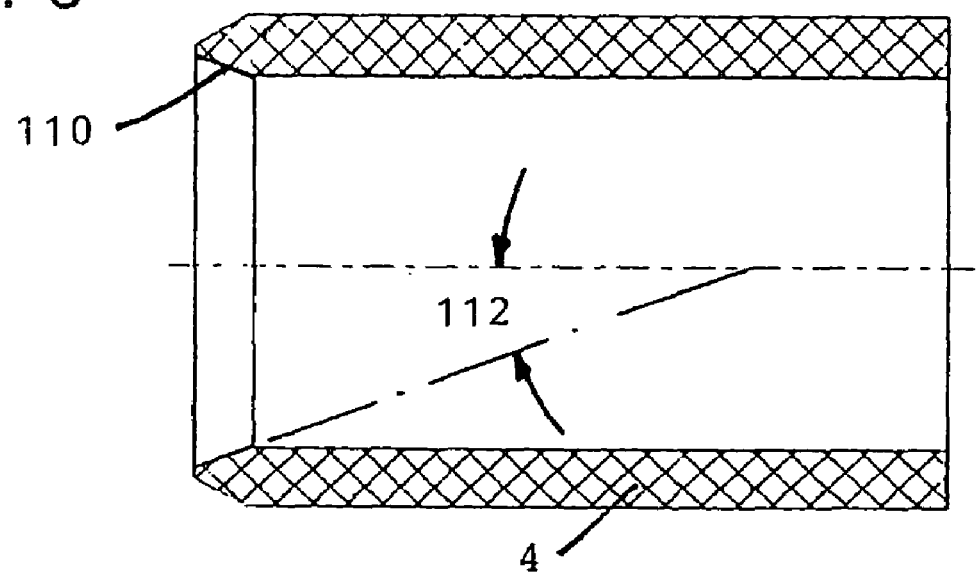
FIG. 6 shows a specially designed pipe end.

FIG. 6 shows a further embodiment of a pipe end 4 to be connected to the plug-in coupling. The pipe end has an internal slope 110 which forms a chamfer angle 112 relative to the longitudinal axis 18. This chamfer angle 112 is advantageously in the range between 15° and 35°, in particular between 20° and 30°. Therefore on insertion of the pipe into the plug-in coupling the forces acting in the axial direction on the sealing element are reduced. The forces directed at the base of the annular gap between the base body and the sleeve are increased, and the overall risk of the gasket slipping out of the longitudinal groove of the base body is thus reduced.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A plug-in coupling comprising:
a base body;
an annular sealing element;
a clamping ring; and
an annular body which is connectable to the base body, wherein
an inserted pipe end in sealing contact with the sealing element can be fixedly secured in the plug-in coupling by the clamping ring,
the sealing element is arranged in an annular groove in the base body and has two sealing beads which contact an inside surface of the inserted pipe end,
the annular groove of the base body has a radially outwardly directed holding body which engages in a radially inwardly arranged annular groove of the sealing element,
the two sealing beads of the sealing element are substantially circular in cross-section, with their respective circular cross-sections located essentially tangential to a cylindrical inner surface of the sealing element and oriented essentially perpendicular to the cylindrical inner surface of the sealing element and parallel to a longitudinal axis of the sealing element,
the two sealing beads are longitudinally separated by a connecting part having a length greater than a radius of either sealing bead circular cross-section, and the annular groove of the sealing element is arranged between the two sealing beads, outside of a circumference of either sealing bead.

2. A plug-in coupling according to claim 1, wherein a deformation space is provided axially between the two sealing beads.

3. A plug-in coupling according to claim 2, wherein the deformation space surrounds the connecting part which connects the two sealing beads of the sealing element.

4. A plug-in coupling according to claim 3, wherein the connecting part has a radial thickness which is smaller than the radial thickness of at least one of the two sealing beads.

5. A plug-in coupling according to claim 4, wherein the connecting part has a radial thickness in the range between 40% and 70% of the radial thickness of one of the sealing beads.

6. A plug-in coupling according to claim 5, wherein the connecting part has a radial thickness in the range between 50% and 60% of the radial thickness of one of the sealing beads.

7. A plug-in coupling according to claim 1, wherein the two sealing beads comprise two O-rings integrated into the annular sealing element such that radial outside surfaces of said O-rings form said sealing beads.

8. A plug-in coupling according to claim 1, wherein said annular sealing element comprises two O-rings joined together in one part by the connecting part.

9. A plug-in coupling according to claim 1, wherein at least one of the sealing beads in an axial sectional plane has a diameter at least approximately equal to the radial thickness of a sealing region of said sealing bead.

10. A plug-in coupling according to claim 1, wherein the annular radial groove inside the sealing element is formed in the connecting part which connects the two sealing beads.

11. A plug-in coupling according to claim 10, wherein the annular radial groove is situated outside the circular contours of the sealing beads.

12. A plug-in coupling according to claim 10, wherein the holding body is an annular rib.

13. A plug-in coupling according to claim 1, wherein the sealing element has a forward axial end part axially in front of a first of the sealing beads nearest the forward axial end part.

14. A plug-in coupling according to claim 13, wherein the forward axial end part has an axial length which is smaller than the radial thickness of the first sealing bead.

15. A plug-in coupling according to claim 14, wherein the forward axial end part has an axial length in the range between 10% and 40% of the radial thickness of the first sealing bead.

16. A plug-in coupling according to claim 15, wherein the forward axial end part has an axial length in the range between 15% and 30% of the radial thickness of the first sealing bead.

17. A plug-in coupling according to claim 1, wherein the sealing element has an axial rear end part following a second sealing bead of the two sealing beads.

18. A plug-in coupling according to claim 17, wherein the axial rear end part has an axial length smaller than the radial thickness of the second sealing bead.

19. A plug-in coupling according to claim 18, wherein the axial rear end part has an axial length in the range from 30% to 60% of the radial thickness of the second sealing bead.

20. A plug-in coupling according to claim 19, wherein the axial rear end part has an axial length in the range from 40% to 50% of the radial thickness of the second sealing bead.

21. A plug-in coupling according to claim 1, wherein a front end of the annular body or the base body adjacent the sealing element is provided with an extension with a guide region for aligning a pipe end inserted into the plug-in coupling essentially coaxially with the longitudinal axis of the plug-in coupling.

22. A plug-in coupling according to claim 21, wherein said extension has an axial length in the range from 30% and 60% of the inside diameter of the annular body.

23. A plug-in coupling according to claim 22, wherein said extension has an axial length in the range from 40% and 50% of the inside diameter of the annular body.

24. A plug-in coupling according to claim 21, wherein the extension or radially outer guide region of the base body has an axial length in the range between 30% and 60% of the inside diameter of the annular body.

25. A plug-in coupling according to claim 24, wherein said axial length is between 40% and 60% of the inside diameter of the annular body.

26. A plug-in coupling according to claim 1, wherein the sealing element is situated in the annular groove of the base body with a forward end face arranged a predetermined distance from at least one of a web and a stop face of the base body.

27. A plug-in coupling according to claim 26, wherein said distance is at least approximately equal to or greater than an inside diameter of an inside guide region of the annular body.

28. A plug-in coupling according to claim 27, wherein said distance is in the range between 50% and 130% of the inside diameter of the inside guide region of the annular body.

29. A plug-in coupling according to claim 28, wherein said distance is in the range between 60% and 120% of the inside diameter of the inside guide region of the annular body.

30. A plug-in coupling according to claim 28, wherein said distance is in the range between 70% and 110% of the inside diameter of the inside guide region of the annular body.

31. A plug-in coupling according to claim 1, wherein said annular body has an inside guide region having an axial length in the range between 30% and 60% of the inside diameter of the annular body.

32. A plug-in coupling according to claim 31, wherein said inside guide region has an axial length in the range between 40% and 50% of the inside diameter of the annular body.

* * * * *